United States Patent [19]

Moir

[11] Patent Number: 4,829,979
[45] Date of Patent: May 16, 1989

[54] IMPACT ABSORBING DEVICE FOR A VEHICLE

[75] Inventor: William H. Moir, Southfield, Mich.

[73] Assignee: Chrysler Motors Corporation, Highland Park, Mich.

[21] Appl. No.: 126,136

[22] Filed: Nov. 27, 1987

[51] Int. Cl.⁴ .................. B60R 19/26; B60R 19/34; B60R 19/04; F16F 7/12
[52] U.S. Cl. ................................. 293/132; 293/133; 293/155; 188/377
[58] Field of Search .............. 293/102, 126, 132, 133, 293/154, 155; 296/189; 188/371, 376, 377

[56] References Cited

U.S. PATENT DOCUMENTS

| | | | |
|---|---|---|---|
| 3,437,367 | 4/1969 | Blank | 293/133 |
| 3,834,686 | 9/1974 | Moritz et al. | 267/116 |
| 3,841,678 | 10/1974 | Clemens | 293/133 |
| 3,848,886 | 11/1974 | Feustel et al. | 296/189 X |
| 3,887,223 | 6/1975 | Bez | 293/133 |
| 4,109,899 | 8/1978 | Takatsu | 267/140 |
| 4,190,276 | 2/1980 | Hirano et al. | 293/133 |
| 4,303,267 | 12/1981 | Haberle et al. | 293/155 |
| 4,336,868 | 6/1982 | Wilson et al. | 293/133 |

Primary Examiner—Andres Kashnikow
Assistant Examiner—Timothy Newholm
Attorney, Agent, or Firm—Edward A. Craig

[57] ABSTRACT

An impact absorbing device is provided for a vehicle having a bumper. The device comprises an energy absorber having an axis along which it is reducible in length at a substantially uniform rate in response to an impact force to absorb the energy of impact. At last one bendable plate is secured between the vehicle frame and bumper adjacent to but spaced vertically from the energy absorber. When the bumper is impacted with a force at an angle to said axis, the plate will bend in a direction generally perpendicular to the axis and constrain the energy absorber to reduce in length along the axis and absorb the impacting force.

5 Claims, 4 Drawing Sheets

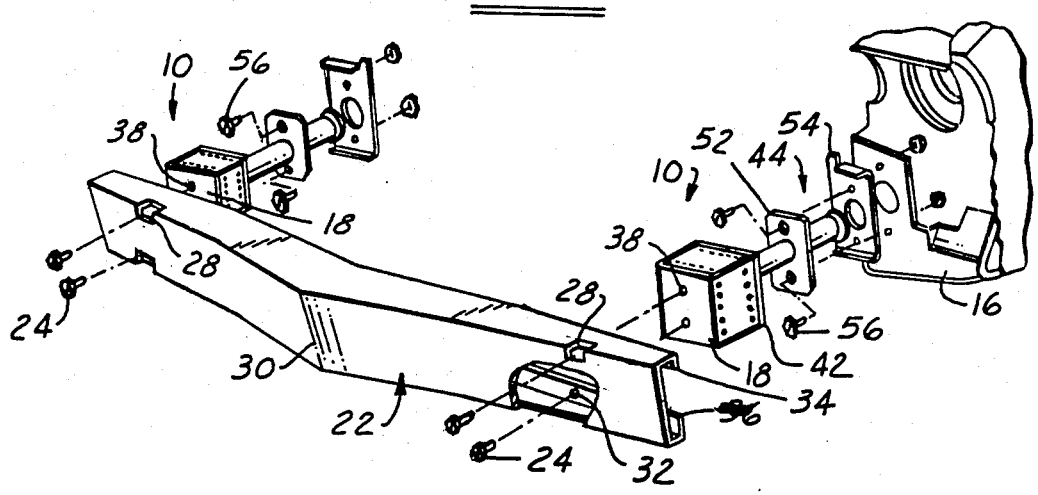
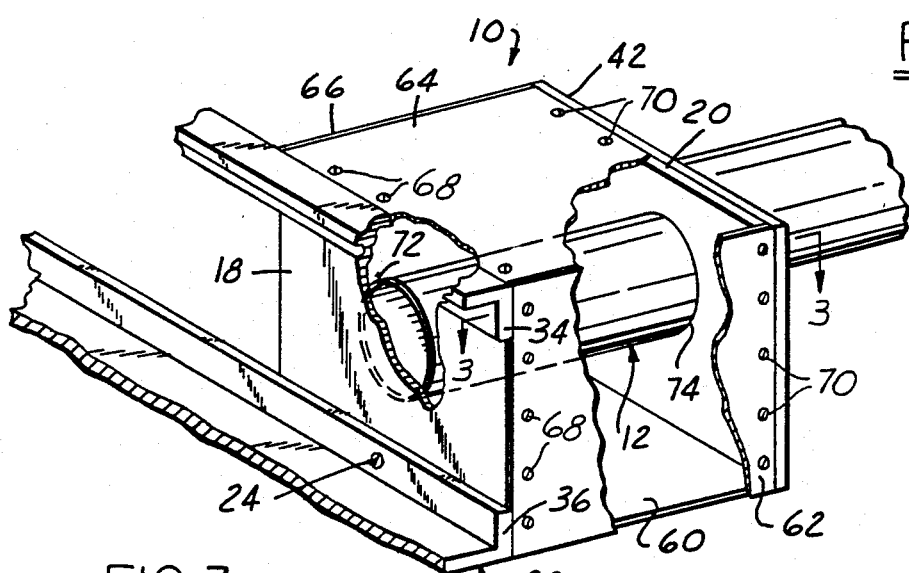
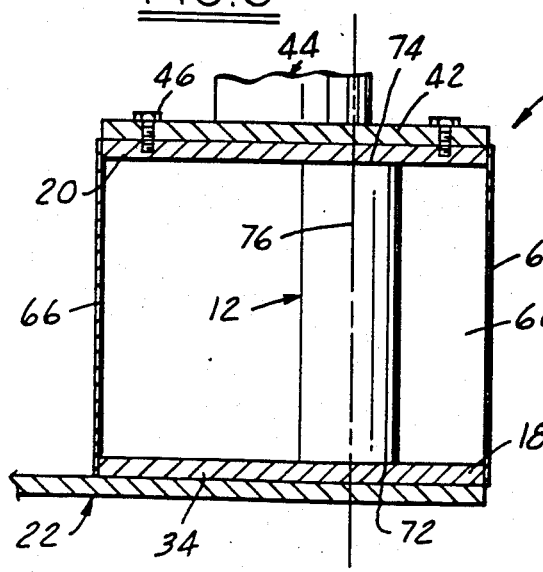
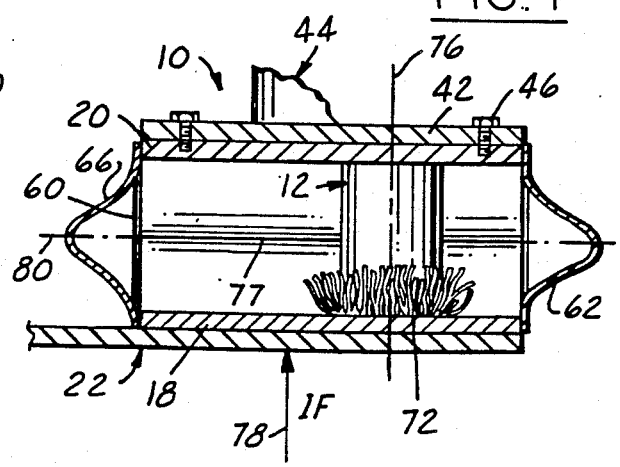

IMPACT ABSORBING DEVICE FOR A VEHICLE

BACKGROUND OF THE INVENTION

1. Field of the Invention

The impact absorbing device is mounted between the bumper and vehicle frame to absorb crash forces. It includes an energy absorber and at least one bendable plate adjacent to but spaced vertically from the energy absorber.

2. Prior Art

Various forms of energy absorbers have been proposed for vehicles to reduce the shock of an impact on vehicle occupants and vehicle structure. Devices which have been proposed in the past have been effective to absorb impact shock when the vehicle is involved in an accident wherein the impact is directly applied to the front or rear bumpers in a head-on fashion. However, if the impact is angular, prior art devices have been generally ineffective because they are designed for direct impact only. Many automobile accidents do occur in an angular fashion as a result of the driver's swerving the vehicle in an attempt to avoid contact. Most energy absorbers are designed to compress or deform in a linear direction, either fore or aft of the vehicle. When such vehicles are struck at an angle, the sideward force results in sideward bending or tipping of the energy absorber with the end result that it cannot function as desired.

Attempts have been made in the past to overcome this problem by the provision of linkage between the energy absorber and the bumper. The object of the linkage is to translate the forces of impact in such a fashion so as to constrain energy absorber movement in the axial direction for which the absorber is designed. Examples of this approach are shown in U.S. Pat. Nos. 3,834,686, Moritz et al and 4,109,899, Takatsu. However, such arrangements have not been entirely satisfactory in that there is always a translation of forces in linkage structures which results in a non-linear application of the impact forces when such forces are at an angle to the bumper. Further, it is difficult to design linkages which are strong enough to take high-impact forces or forces at a relatively high angle such as a thirty degree crash impact.

The present invention provides a plate construction which is mounted adjacent to an energy absorber. The plate can only bend in one direction. It is oriented so that it bends in a direction perpendicular to the axis along which the energy absorber is designed to function and constrain the energy absorber to collapse along such axis with the result that the desired shock absorbing effect is obtained.

SUMMARY OF THE INVENTION

An impact absorbing device is provided for a vehicle having a bumper. The device comprises an energy absorber having an axis along which it is reducible in length at a substantially uniform rate in response to an impact force to absorb the energy of impact. The energy absorber has two ends which define the axis. Mounting means are provided and fixedly secure one end of the energy absorber to the vehicle frame and the other end thereof to the vehicle bumper with said axis being substantially perpendicular to the bumper and vehicle. At least one bendable plate is secured between the vehicle and bumper adjacent to but spaced vertically from the energy absorber. The plane of the plate is generally parallel to said axis whereby when the bumper is impacted with a headon or angular force the plate will bend in a direction generally perpendicular to said axis and constrain the energy absorber to reduce in length along said axis and absorb the impacting force.

Preferable, at least two bendable plates are provided with one of these plates being positioned above the energy absorber and the other of the plates being positioned below the energy absorber. The provision of four bendable plates is preferred with the plates being positioned around the energy absorber to form an enclosure and with each of these plates being independently bendable.

The energy absorber is preferably a tubular element and is preferably positioned off-center with respect to the bendable plate and towards the nearest outer end of the bumper.

IN THE DRAWINGS

FIG. 1 is an exploded view of a portion of a vehicle frame and vehicle bumper with one embodiment of the impact absorbing device of the present invention illustratively incorporated into the structure interconnecting the bumper with the vehicle frame.

FIG. 2 is an enlarged view in perspective of the impact absorbing device shown in FIG. 1;

FIG. 3 is a sectional view of the impact absorbing device taken substantially along the line 3—3 of FIG. 2 looking in the direction of the arrows;

FIG. 4 is a view similar to FIG. 3 illustrating the impact absorbing device after it has been impacted;

FIG. 8 illustrates a vehicle crashing into a barrier head-on;

DETAILED DESCRIPTION OF THE PREFERRED EMBODIMENT

Referring to FIGS. 1-5, it will be noted that the impact absorbing device 10 comprises an energy absorber 12 which is mounted between a vehicle bumper reinforcing member 22 and vehicle frame 16.

Figure 5:
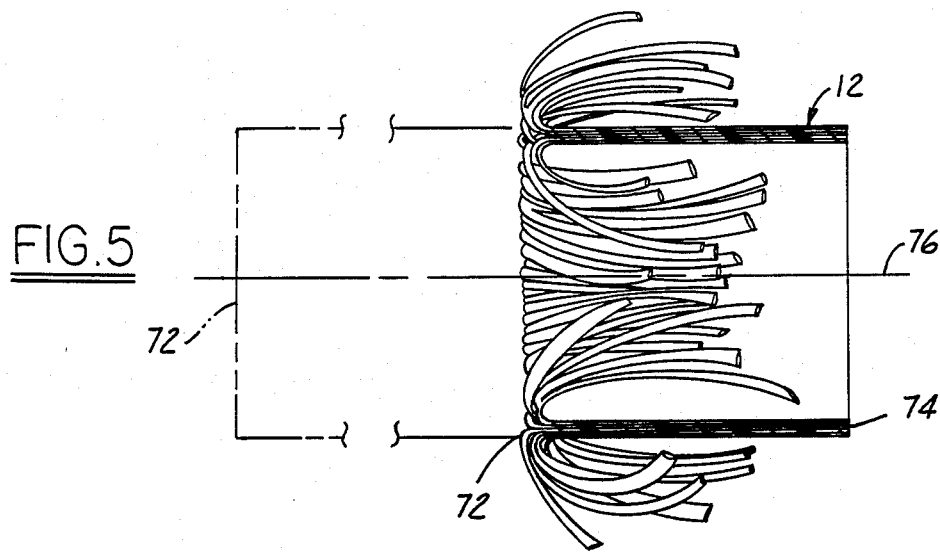
FIG. 5 is a view of an enlarged scale in section of an energy absorber having a tubular shape and fabricated of a composite material illustrating the manner in which this energy absorber shreds as it absorbs an impact force.

The energy absorber 12 is in the form of a tubular member. The energy absorber 12 in the embodiment shown is fabricated of a composite polyester and fiberglass material. A suitable material is sold under the trademark "EXTREN 625" by Morrison Molding Fiberglass Company of Bristol, Va. In the embodiment shown, a round tube four inches in diameter, twelve inches long and having a wall thickness of one-eighth inch was used. Such a tube was used for the test results illustrated in the graphs of FIGS. 11, 13 and 14. Such a tube absorbs impact by fracturing and shredding as illustrated in FIGS. 4 and 5, the fracturing action absorbing impact energy as the tube is reduced in length. The energy absorber 12 is mounted between a pair of crash plates 18, 20. It may be held in place as, for example, by adhesives.

One plates 18 is secured to a bumper reinforcing member 22. Normally, a bumper facia is secured to member 22, the bumper facia being a non-load bearing ornamental structure. The plate 18 is secured in place by means of screws 24, which are mounted through openings 28 in the outer portion 30 of the member 22 and pass through openings 32 provided in flanges 34, 36 into threading engagement with threaded openings 38 provided in the plate 18.

The other plate 20 is secured to a mounting plate 42 provided on one end of an energy absorber 44 which forms a normal part of the vehicle construction. Screws 46 extend through suitably threaded opening means in the plates to secure the plates together. The energy absorber 44 is a low-impact unit designed to protect the bumper structure against low speed impacts of 2½ to 5 miles per hour and is standard on current vehicles. Such an energy absorber is capable of back and forth movement to move the bumper structure closer to the vehicle in response to a low-speed impact and then return the bumper to its original position after impact. The energy absorber 44 is secured to vehicle frame member 16 by means of brackets 52, 54 and nut and bolt structures 56. The above referenced structure relating to the energy absorber 44 is conventional and does not form part of the present invention.

Four bendable plates 60, 62, 64, 66 are secured between the vehicle frame and bumper adjacent to but spaced from the energy absorber 12. The end of the plates are attached to the outer edges of the crash plates 18, 20 by mounting means comprising a plurality of screws 68, 70 as will be noted. Each plate 60, 62 64, 66 is capable of bending independently of any bending action of any other plate 60, 62, 64, 66, the plates, as will be noted, being unattached to any other structure between the ends thereof which are secured in place by the screws 68,70. As will be noted, the bendable plates are thinner than the crash plates. This is done so that these plates will bend upon impact. The plate thickness may be, for example, 0.030–0.032 inch. The plates may be fabricated of hot or cold rolled steel, for example. Suitable steel is, for example, SAE 1008 or SAE 1010. Other steels, such as spring steels, may be used in fabricating the plates. Other types of material such as a fiber reinforced polyester which is bendable may also be used. The plates must, however, be bendable. A bendable plate is defined as one that will bow under a load as opposed to fracturing.

The energy absorber 12 has two ends 72, 74 which define an axis 76 along which the energy absorber is reducible in length at a substantially uniform rate in response to an impact force 78 to absorb the energy of impact as will be noted in FIGS. 3 and 4. As previously mentioned, when an impact force is applied, one end 72 of the composite tube illustrated will fracture and shred thus resulting in reducing the length of the tubular member. The rate of fracture is relatively uniform and results in a uniform rate of reduction of length upon a given force being applied with a resultant uniform absorption of energy of impact.

As will be noted in FIG. 3, the planes of the plates 62, 66 are generally parallel to the axis 76. The other plates 60, 64 which are perpendicular to plates 62, 66 are also generally parallel to the axis 76. Further, the axis 76 is substantially perpendicular to the bumper structure and to the vehicle frame. This arrangement is generally desirable so that the energy absorber 12 will be constrained to reduce in length along the axis 76 and absorb the impacting force.

As will be noted in FIG. 4, the plates 62, 66 will bend outwardly in a direction generally perpendicular to the axis 76 as indicated by line 80 to cause the desired reduction in length of the energy absorber 12. Not only will the plates 62, 66 bend in this direction but also the plates 60, 64 will bend in a direction perpendicular to the axis 76 as indicated at 77 with plate 60 to aid in this function. The plates may be initially bowed outwardly or creased as an aid in directing them into the proper direction of bend upon impact.

The energy absorber 12 is desirably positioned off-center with respect to the plates 62, 66 towards the nearest outer end of the bumper as shown in FIG. 3. The reason for this is to reduce the moment arm particularly of an angular impact which normally occurs closer to the outer ends of the bumper than towards the center of the bumper. The smaller moment results in the need for less material for the energy absorber because the resultant force is less.

Figure 10:
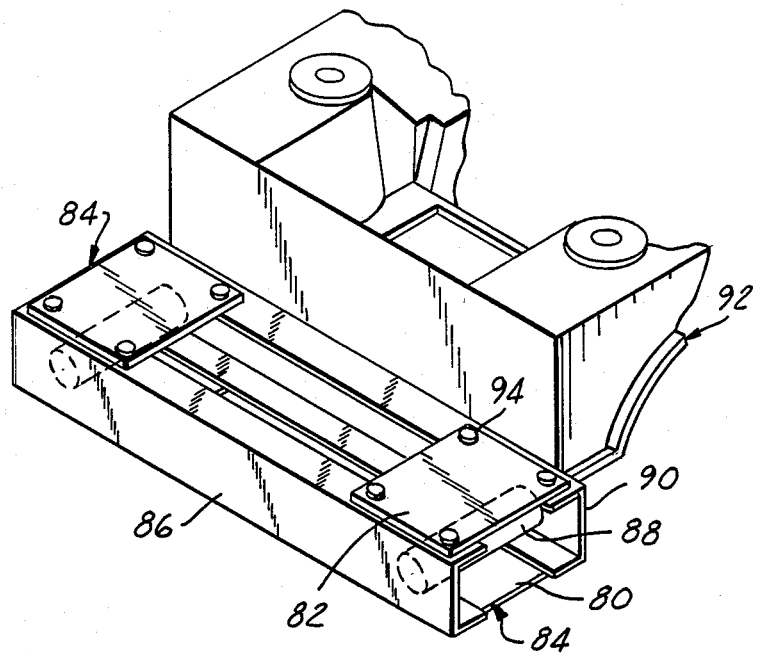
FIG. 10 is a view in perspective of a vehicle engine compartment illustrating mounting of another embodiment of the impact absorbing device of the present invention thereon.

FIG. 10 illustrates another embodiment of the impact absorbing device. As will be noted in FIG. 10, only two plates 80, 82 are used for the impact absorbing devices 84, one at each end of the bumper reinforcing member 86. The energy absorber 88 in this case is a steel tube which is secured as by welding between the bumper reinforcing member 86 and frame member 90 of vehicle 92 (the engine compartment being illustrated). The plates 80, 82 are secured in place by means of screws 94. The tube illustrated had a three inch diameter, was 12 inches long and had a wall thickness of 1/16 inch. It was fabricated of mild steel.

As will be noted, one of the plates 80, 82 is positioned above the energy absorber 88 and the other of the plates 80 is positioned below the energy absorber 88. In a two-plate impact absorbing device, it is desirable that the plates be positioned above and below the energy absorber as shown in order that they may absorb angular impact without bending sidewardly. The plates 80, 82, upon either head-on or angular impact, will bend perpendicularly to the axis to the energy absorber in directions downwardly and upwardly.

Figure 6:
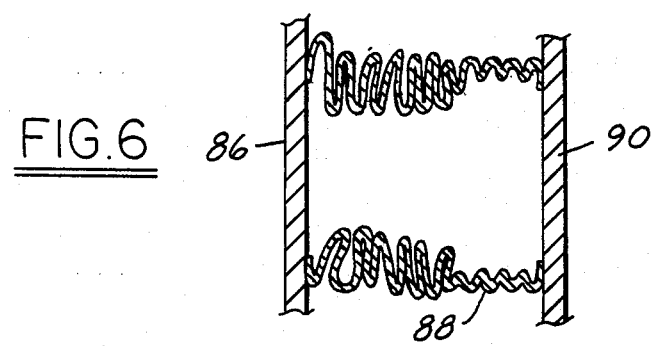
FIG. 6 illustrates a second type of tubular energy absorber in section fabricated of metal illustrating the manner in which this device collapses after being impacted.

FIG. 6 illustrates the accordion-like configuration which the energy absorber 88 assumes after it has been impacted. The formation of the shape illustrated in FIG. 6 results in substantial uniform absorption of the impact force.

The use of two plates as illustrated in FIG. 10 does give satisfactory results. A single plate may be used and will perform in an improved fashion over an energy absorber having no plates at all to constrain its movement after impact. Preferably, four plates as shown in FIGS. 1-4 are used to form an enclosure around an energy absorber to give maximum results, the side plates accepting vertical force components. Also, the side plates improve the structural rigidity for jacking and towing purposes. It is, of course, important as previously mentioned that the four plates not be interconnected one to the other so that they may independently bend upon impact.

Figure 7:
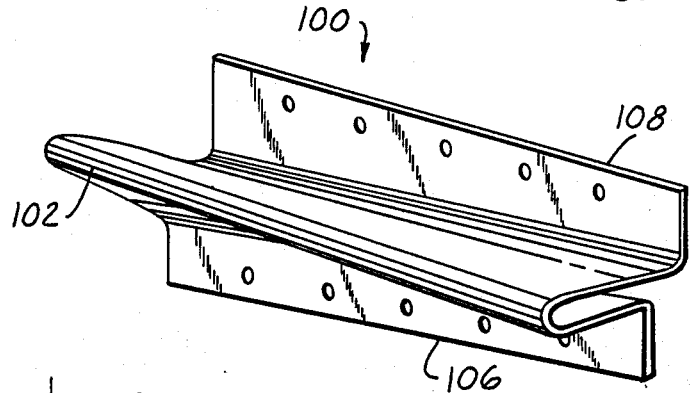
FIG. 7 is a view in perspective illustrating the condition of a bendable plate forming part of the impact absorbing device after the plate has been bent as a consequence of an impact.

FIG. 7 illustrates the condition of a plate 100 after it has been bent upon impact. As will be noted, the bend 102 of the plate 100 is not exactly parallel to the edges 106, 108. However, the bend is adequate to result in the desired constraining of the reduction in length of the energy absorber to give the desired impact absorbing results.

Figure 8:
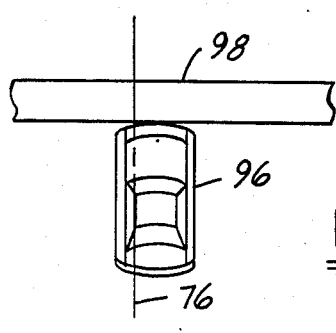
Figure 9:
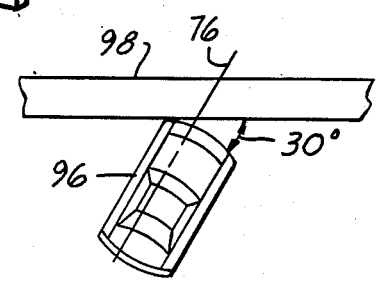
FIG. 9 illustrates a vehicle crashing into a barrier at a thirty degree angle.

FIGS. 11-16 are graphs representing the results of impacts using various configurations with and without plates and energy absorbers and wherein the impact is either in the direction of the axis 76 or at an angle thereto. Where used, a two plate system as in FIG. 10 was employed. FIGS. 8 and 9 illustrate these two conditions. In FIG. 8 a vehicle 96 is shown impacted into the barrier 98 at a right angle thereto resulting in a force in the direction of the axis 76 of the energy absorber. In FIG. 9 the vehicle 96 is illustrated impacting the barrier 98 at an angle, representatively thirty degrees, with the resultant impact force being at an angle to the axis 76. It will be appreciated that while the vehicle is shown being impacted at the front end, similar results will be achieved if the vehicle is impacted at the rear end with the impacting absorbing device in place.

Figure 13:
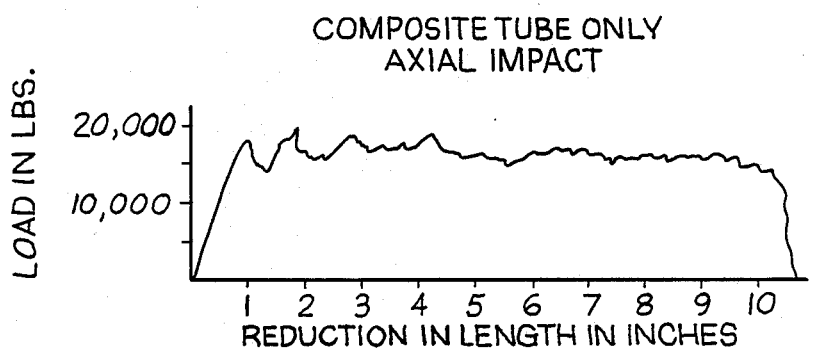
FIG. 13 is a graph illustrating use of a composite tube only as an impact absorbing device without the use of plates and with a frontal impact.
Figure 14:
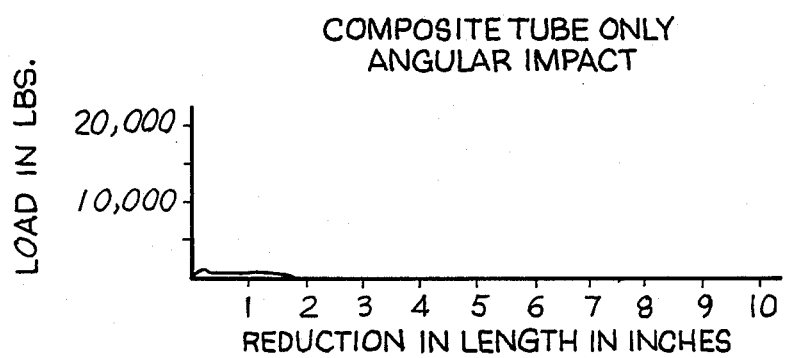
FIG. 14 is a graph illustrating the use of a composite tube only with no plates and with the impact being angular.

FIG. 13 illustrates the results when the bumper is impacted with a force in the direction of the axis 76 as in FIG. 8. As will be noted a composite tube as shown in FIG. 1 was used. The impacting force reached a level of about twenty thousand pounds. This may occur at, for example, speeds of thirty miles per hour in a 3000 pound vehicle. The result was satisfactory, the tube absorbing the force in a uniform manner as desired. The reduction in length in inches was a little over ten inches at which point the energy absorbing ability falls off for the reason that the plates prevent further reduction in length of the energy absorber. As shown in FIG. 14, when a composite tube is impacted at an angle, it has negligible ability to absorb impact. This occurs because of the sideward tilting of the tube.

Figure 15:
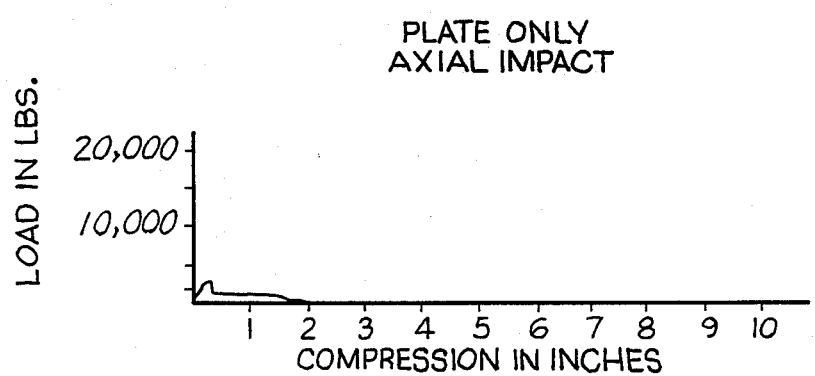
FIG. 15 is a graph illustrating the use of plates only with the impact being a frontal impact.
Figure 16:
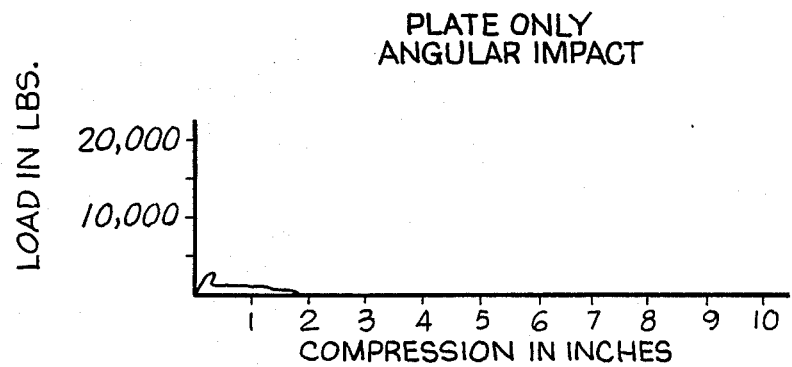
FIG. 16 is a graph illustrating the use of plates only with the impact being an angular impact.

In FIGS. 15 and 16, plates alone were used with both axial and angular impacts. Again, virtually no energy absorbing ability was displayed for the reason that when the plates are bent by themselves, they offer little energy absorbing ability.

Figure 11:
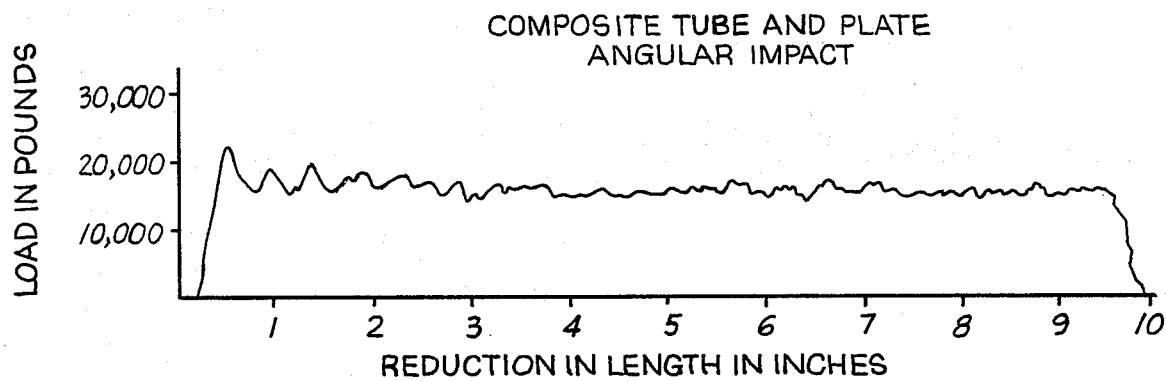
FIG. 11 is a graph of the result of impacting the impact absorbing device of the present invention in which a composite tube and plate are used with the impact being angular.
Figure 12:
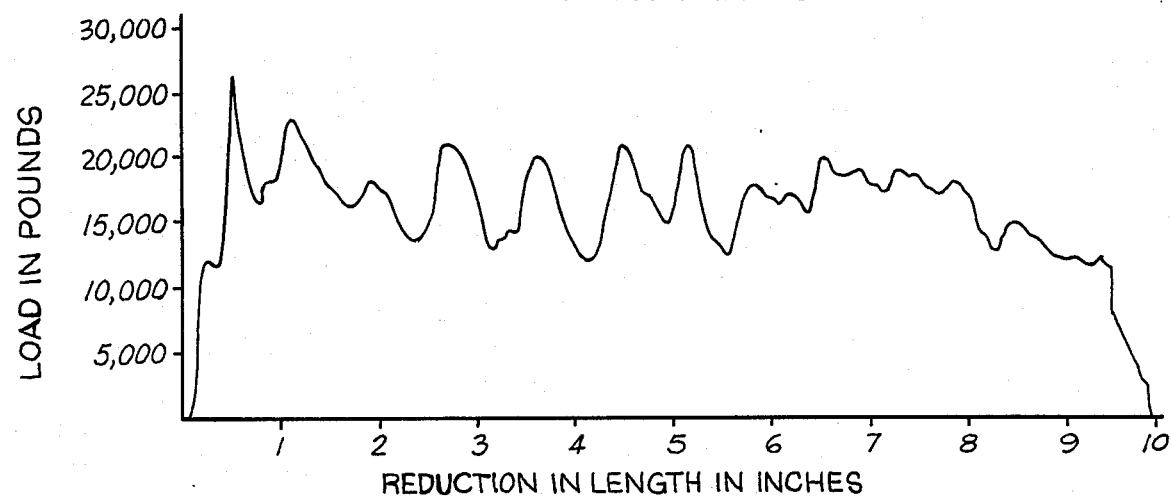
FIG. 12 is a graph similar to that shown in FIG. 11 illustrating the use of a steel tube as an energy absorber.

However, as shown in FIGS. 11 and 12, when either a composite or steel tube is used along with the plates, and with the impact being angular, the energy absorbing ability is about equal to that of FIG. 13 with, however, the composite tube illustrating superior uniformity in absorbing impact forces.

While tubular energy absorbers have been illustrated, other types of linear energy absorbers may be used.

I claim:

1. An impact absorbing device for a vehicle having a vehicle bumper and a vehicle frame comprising an energy absorber having an axis along which it is reducible in length at a substantially uniform rate in response to an impact force to absorb the energy of impact, the energy absorber having two ends which define said axis, mounting means fixedly securing one end of the energy absorber to the vehicle frame and the other end thereof to the vehicle frame and the other and thereof to the vehicle bumper with said axis being substantially perpendicular to the vehicle bumper and vehicle frame, said energy absorber being adjacent to but spaced apart from a constraining means, said constraining means constraining the energy absorber during impact to reduce in length along said axis, said constraining means comprising at least one bendable plate extending between the vehicle frame and the vehicle bumper and being spaced vertically apart from the energy absorber, the bendable plate having two ends, mounting means fixedly securing one end of the bendable plate to the vehicle frame and the other end thereof to the vehicle bumper, the bendable plate being unattached to any other structure between the ends thereof, the plane of the plate being generally parallel to said axis and independently bendable so that when the bumper is impacted with a force at an angle to said axis the plate will bend in a direction generally perpendicular to said axis and constrain the energy absorber to reduce in length along said axis and absorb the impacting force.

2. An impact absorbing device as in claim 1, further characterized in that the energy absorber is a tubular element.

3. An impact absorbing device as in claim 1, wherein said constraining means further comprises two independently bendable plates, one of the plates being positioned below the energy absorber, neither bendable plate being attached to any other structure between the ends thereof.

4. An impact absorbing device as in claim 1,
  wherein said constraining means further comprises four independently bendable plates, said plates being positioned around the energy absorber to form an enclosure, each of said plates being independently bendable and unattached to any other structure between the ends thereof.

5. An impact absorbing device as in claim 1, further characterized in that the energy absorber is positioned off-center with respect to said bendable plate towards the nearest outer end of the bumper.

* * * * *